United States Patent
Liu et al.

(10) Patent No.: US 10,228,917 B2
(45) Date of Patent: *Mar. 12, 2019

(54) MAPPING OF SOFTWARE CODE VIA USER INTERFACE SUMMARIZATION

(71) Applicant: International Business Machines Corporation, Armonk, NY (US)

(72) Inventors: Peng Liu, Yorktown Heights, NY (US); Marco Pistoia, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,470

(22) Filed: May 11, 2017

(65) Prior Publication Data

US 2018/0329694 A1 Nov. 15, 2018

(51) Int. Cl.
| | |
|---|---|
| *G06F 8/36* | (2018.01) |
| *G06F 8/38* | (2018.01) |
| *G06F 8/70* | (2018.01) |
| *G06F 17/30* | (2006.01) |

(52) U.S. Cl.
CPC .................. *G06F 8/38* (2013.01); *G06F 8/36* (2013.01); *G06F 8/70* (2013.01); *G06F 17/3069* (2013.01); *G06F 17/30628* (2013.01)

(58) Field of Classification Search
CPC .................. G06F 8/38; G06F 8/40; G06F 8/70
See application file for complete search history.

(56) References Cited

U.S. PATENT DOCUMENTS

| | | | | |
|---|---|---|---|---|
| 5,428,788 | A * | 6/1995 | Schwanke | G06F 11/3604 714/E11.218 |
| 6,970,883 | B2 * | 11/2005 | Ku | G06F 17/3064 707/752 |
| 7,503,035 | B2 * | 3/2009 | Zeidman | G06F 8/71 434/118 |
| 7,716,218 | B1 * | 5/2010 | Pogue | G06F 17/30867 707/728 |

(Continued)

OTHER PUBLICATIONS

Jiang et al., "DECKARD: Scalable and Accurate Tree-Based Detection of Code Clones," Proceedings of the 29th International Conference on Software Engineering, May 2007, pp. 96-105, IEEE, 10 pages.

(Continued)

*Primary Examiner* — Chat C Do
*Assistant Examiner* — Douglas M Slachta
(74) *Attorney, Agent, or Firm* — Amin, Turocy & Watson, LLP

(57) ABSTRACT

Techniques for identifying similar software code are provided. In one example, a computer-implemented method comprises: based on detection of an input, determining, by a device operatively coupled to a processor, a user interface functionality associated with a website; and based on a likelihood that the user interface functionality and a result of a query have a defined level of correlation, matching, by the device, the result of the query to the user interface functionality. The computer-implemented method can further comprise mapping, by the device, a vector associated with the website, to an integer value, employing a hash function.

16 Claims, 10 Drawing Sheets

(56) References Cited

U.S. PATENT DOCUMENTS

| | | | | |
|---|---|---|---|---|
| 8,341,155 | B2 | 12/2012 | Lane | |
| 8,423,951 | B1* | 4/2013 | Koller | G06F 8/10 |
| | | | | 717/104 |
| 9,235,386 | B2 | 1/2016 | Carlson et al. | |
| 9,311,062 | B2 | 4/2016 | Braun et al. | |
| 2002/0078057 | A1* | 6/2002 | Wang | G06F 17/3089 |
| 2006/0168555 | A1* | 7/2006 | Represas Ferrao | G06F 8/10 |
| | | | | 717/104 |
| 2008/0235106 | A1* | 9/2008 | Reisman | G06F 8/65 |
| | | | | 705/64 |
| 2008/0307430 | A1* | 12/2008 | Friedlander | G06Q 50/22 |
| | | | | 719/313 |
| 2009/0006338 | A1* | 1/2009 | Ives | G06F 17/30867 |
| 2009/0019031 | A1* | 1/2009 | Krovitz | G06F 17/30274 |
| 2011/0022943 | A1* | 1/2011 | Bou-Ghannam | |
| | | | | G06F 17/30902 |
| | | | | 715/234 |
| 2011/0320430 | A1* | 12/2011 | Coupe | G06F 17/30884 |
| | | | | 707/711 |
| 2012/0110125 | A1* | 5/2012 | Chen | G06F 3/04886 |
| | | | | 709/218 |
| 2013/0034337 | A1* | 2/2013 | Hefeeda | H04N 5/913 |
| | | | | 386/252 |
| 2016/0070567 | A1* | 3/2016 | Furtwangler | G06F 8/30 |
| | | | | 717/122 |
| 2016/0092768 | A1* | 3/2016 | Patil | G06F 8/65 |
| | | | | 706/46 |
| 2016/0119685 | A1* | 4/2016 | Jain | H04N 21/4826 |
| | | | | 725/40 |
| 2016/0132902 | A1* | 5/2016 | Davar | G06Q 30/0201 |
| | | | | 705/7.29 |
| 2017/0193053 | A1* | 7/2017 | Glover | G06F 17/3053 |
| 2018/0052808 | A1* | 2/2018 | Wan | G06F 17/2247 |

OTHER PUBLICATIONS

Gabel et al., "Scalable Detection of Semantic Clones," Proceedings of the 13th International Conference on Software Engineering, May 2008, ACM, 10 pages. www.cs.ucdavis.edu/~su/publications/icse08-clone.pdf.

"XCTest," Apple Developer Documentation, API Reference, 8 pages. Retrieved on Feb. 8, 2017. https://developer.apple.com/reference/xctest.

Han, "UMBC Semantic Similarity Service," 2013, Ebiquity Lab, UMBC, 1 pages. Retrieved on Feb. 8, 2017. http://swoogle.umbc.edu/SimService/.

Lui et al., "Text Summarization with TensorFlow," Google Research Blog, Aug. 24, 2016, 5 pages. Retrieved on Feb. 8, 2017. https://research.googleblog.com/2016/08/text-summarization-with-tensorflow.html.

Office Action for U.S. Appl. No. 15/842,688 dated Apr. 11, 2018, 33 pages.

* cited by examiner

MAPPING OF SOFTWARE CODE VIA USER INTERFACE SUMMARIZATION

BACKGROUND

The subject disclosure relates to software code searching, and more specifically, to mapping of software code based on information processed via a user interface.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate mapping of software code based on a user interface are described.

According to an embodiment, a computer program product for managing a software code word search can comprise a computer readable storage medium having program instructions embodied therewith. The program instructions can be executable by a processor and the processor can determine a user interface functionality associated with a website based on detection of an input to a system. The program instructions can also be executable to match, by the processor, the result of the query to the user interface functionality based on a likelihood that the user interface functionality and a result of a query have a defined level of correlation.

According to another embodiment, a system can comprise a memory that stores computer executable components, and a processor that executes the computer executable components stored in the memory. The computer executable components of the system can comprise an extraction component that, based on detection of an input to the system, extracts a user interface functionality from a first user interface associated with a mobile application. The computer executable components of the system can also comprise a matching component that, based on a likelihood that the user interface functionality and a result of a query have a defined level of correlation, matches the result of the query to the user interface functionality.

According to yet another embodiment, a computer-implemented method is provided. The computer-implemented method can comprise determining, based on detection of an input, by a device operatively coupled to a processor, a user interface functionality associated with a website. The computer-implemented method can also comprise, based on a likelihood that the user interface functionality and a result of a query have a defined level of correlation, matching, by the device, the result of the query to the user interface functionality.

In some embodiments, one or more of the above elements described in connection with the systems, computer-implemented methods and/or computer program programs can be embodied in different forms such as a computer-implemented method, a computer program product, or a system.

DETAILED DESCRIPTION

Figure 1:
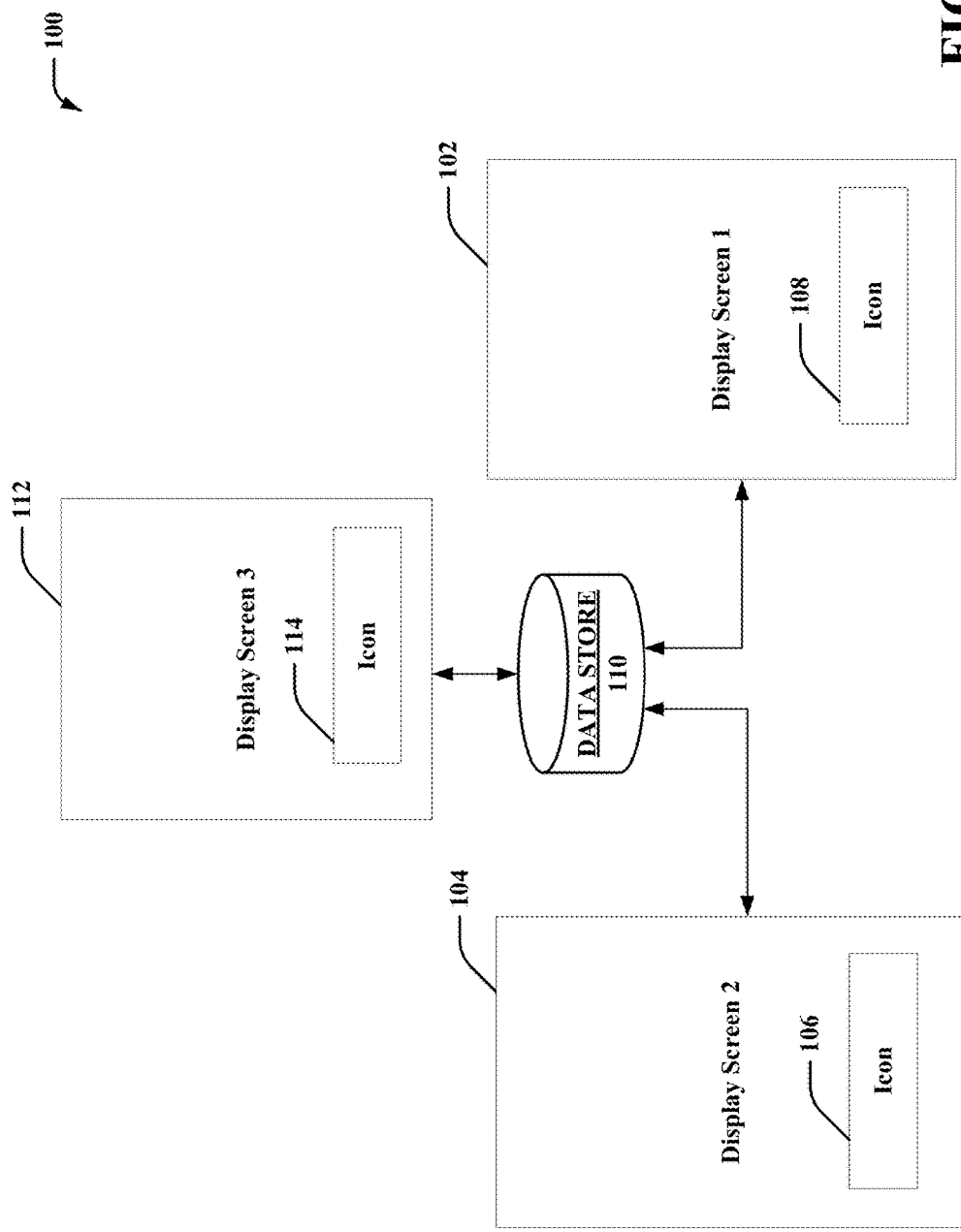
FIG. 1 illustrates a block diagram of an example, non-limiting system that facilitates mapping of software code based on a user interface in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Companies develop webpages and mobile applications on a regular basis. However many of the mobile applications belong to the same industry (e.g., the hotel industry, the automotive industry, the entertainment industry, etc.). Mobile applications and webpages within the same industry can provide overlapping functionality particular to those specific industries. Accordingly, the underlying software code and its implementation can be reusable for other webpages and/or mobile applications, whether in the same industry, a similar industry, or a completely separate industry. Consequently, a correlation between functionality of software code associated with an icon can be determined by building a database, connecting a graphic user interface (GUI) by associating the icon with underlying software code, and/or allowing a user to initiate a query to search the database for the software code. It should be noted that an icon can be any button, image, and/or hyperlink (e.g., a cell of a calendar application, an event tag, a date icon, a time associated with an event, a table, etc.) that can be triggered by a user's actions. For instance, an icon can be associated with a search application, whereby user interaction with the icon can initiate a search function based on software code associated with the icon.

Software code that is executed based on activation of a search icon displayed on a mobile device display screen can perform various actions according to the industry for which it is being used. For instance, if the search icon is on a hotel website, activation of the search icon can initiate a search of available hotels according to defined parameters (e.g., dates, availability, location, rooms, etc.), which can yield a particular result based on the defined parameters. Consequently, although a GUI of the display screen associated with one hotel website may be different from another GUI associated with another website, software code of a search icon associated with the GUI can perform the same function as other software code associated with another search icon even if the icons are labeled differently (e.g., "Search Hotels" vs. "Search"). Because icons can be labeled differently, a semantic comparison between various icons may not yield a true software code functionality comparison between the various icons. For instance, although a "search hotels" icon and a "search" icon could yield the same functionality, the "search" icon functionality could be broader than that of just searching hotels.

One or more embodiments described herein can associate the functionality of software code of one icon with the functionality of software code of another icon irrespective of the icon's semantic similarities and/or distinctions. Leveraging reusable software code can reduce redundant work for developers and allow the developers to choose more efficient code in terms of performance and security.

This disclosure describes systems, computer-implemented methods and/or computer program products that can facilitate mapping of software code based on information provided via a user interface. One or more embodiments described herein include systems, computer-implemented methods, apparatus, and computer program products that facilitate mapping of software code based on a user interface.

FIG. 1 illustrates a block diagram of an example, non-limiting system 100 that facilitates mapping of software code based on a user interface in accordance with one or more embodiments described herein. In various embodiments, the system 100 can be associated with or included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system or the like.

In one embodiment, the system 100 can perform mapping of software code based on a GUI. For example, in one embodiment, the system 100 can perform mapping of software code associated with display screen 1 of a mobile device 102 to software code associated with display screen 2 of another mobile device 104. It should be understood that the mobile devices 102, 104, 112 can be the same mobile device displaying a different screen. An icon 108 can be associated with software code that can perform functions upon activation of the icon 108. For instance, activation of the icon 108 can cause a search function to be performed (e.g., search hotel availability within a specific timeframe). Software code associated with icon 106 can perform these functions. Additionally, the functionality of the software code of icon 106 and the icon 108 can be the same, similar, or completely different.

The system 100 can compare the functionality of the software code of icon 106 to the functionality of the software code of icon 108 and provide data associated with the icons 106, 108 functionality, functionality similarities, and/or functionality disparateness. Using the previous example, the system 100 can ascertain that the software code functionality of icon 108 searches for available hotels. The system 100 can also ascertain that the software code functionality of the icon 106 searches for available hotels. In this scenario, the system 100 can compare the software code functionality of the icon 106 to the software code functionality of the icon 108 to determine a similarity between the search functionalities of the software codes of icons 106, 108. Conversely, the opposite can be true where only one of the software code functionality of the icons 106, 108 is related to hotel searches. Therefore, the comparison data can alternatively indicate that the software code functionality of icons 106, 108 are disparate. In various embodiments, the data associated with the software code functionalities of icons 106, 108, their similarities, and/or disparateness, can then be stored in a data store 110. The data can then be pulled from the data store 110 to generate another icon 114 with the same or similar functionality as that of icons 106, 108.

According to system 100, in one or more embodiments, mapping of software code, based on a GUI, can comprise constructing and training probabilistic classifiers that learn to predict a probability distribution, meaning that the system 100 can be trained to predict a probability distribution over the functionality associated with various icons. In one embodiment, this can be done using standard neural network training algorithms such as stochastic gradient descent with back propagation. For example, the system 100 can be trained to associate specific words (e.g., "hotel search") of an icon with a probability that the specific words belong to a specific genre (e.g., hotel services). Consequently, the system 100 can predict that the words "hotel search" have a defined percentage of likelihood of being associated with hotel services. As the system 100 analyzes additional icons and their associated words, the defined percentage of likelihood can be increased or decreased. For example, if the system 100 determines that the words "hotel search" of another icon is actually not associated with hotel services, then the percentage likelihood can decrease based on this determination.

The system 100 can be employed to use hardware and/or software to solve problems that are highly technical in nature (e.g., software code searches, semantic tagging, determination of code frequency, matching of disparate terms within corpora composed of millions of terms, sentences, etc.), that are not abstract and that cannot be performed as a set of mental acts by a human due to the processing capabilities needed to facilitate mapping of software code based on a GUI, for example. Further, some of the processes performed may be performed by a specialized computer for carrying out defined tasks related to memory operations. For example, a specialized computer can be employed to carry out tasks related to mapping of software code based on a GUI or the like.

In the embodiment shown in FIG. 1, the system 100 can comprise one or more mobile devices 102, 104, 112 and a data store 110, which can be electrically and/or communicatively coupled to one another in various embodiments. As shown in FIG. 1, the mobile device 102 can be communicatively coupled to the data store 110. For instance, the mobile device 102 can request software code that can execute functionality of that similar to the icon 108 from the data store 110. The data store 110 can store the software code of the icon 106, which can execute functionality similar to the software code associated with the icon 108. The software code that the data store 110 stores can be employed to generate the icon 114 to execute the same functionality as that of the icon 106.

Figure 2:
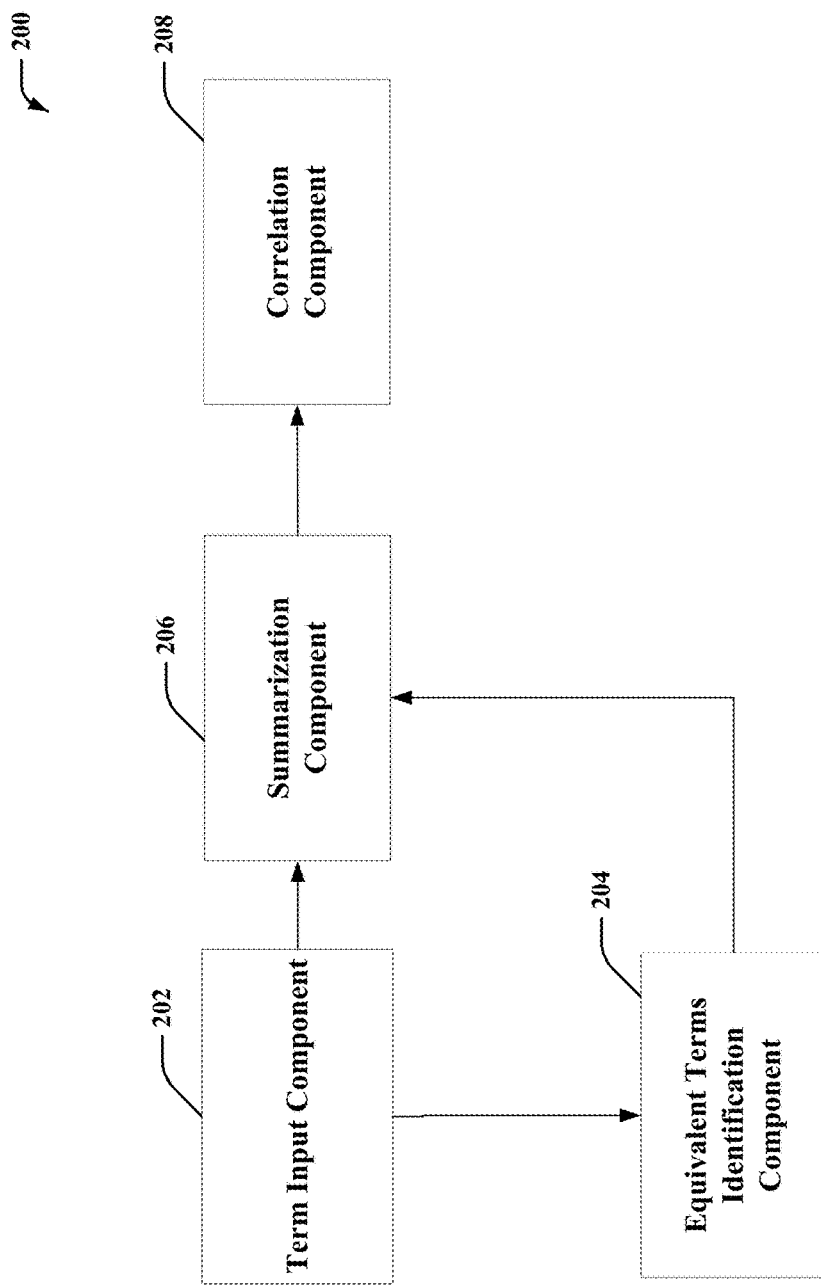
FIG. 2 illustrates another block diagram of an example, non-limiting system that facilitates a summarization and mapping of software code based on a user interface in accordance with one or more embodiments described herein.

FIG. 2 illustrates another block diagram of an example, non-limiting system that facilitates mapping of software code based on a user interface and summarization in accordance with one or more embodiments described herein. Repetitive description of like elements employed in other embodiments described herein is omitted for sake of brevity.

In some embodiments, a term input component 202 can receive and/or extract terms associated with the icon 108. It should be noted that, for purposes of this application terms can comprise one or more terms, a collection of terms, sentences, etc. When the icon 108 receives a command via a graphical user interface, a software program code can be executed, which can analyze an input entered into the term input component 202. Thereafter, a compiler located in the term input component 202 can inject a monitoring code into the software program, which monitors the execution. During execution of a mobile application, the monitoring code can record one or more functions triggered by a command given to the icon 108. The one or more functions can then be analyzed via a compiler program analysis (e.g., side effect analysis, definition-use analysis, etc.), associated with the compiler located in the term input component 202, to infer which term input is used. Thus, the icon 108 can be linked to a specific term input associated with the icon 108. Extracting, via the term input component 202, the term associated with the icon 108 can be performed by querying a runtime system through an application program interface. For example, the terms "hotel search" can be associated with activation of the icon 108. Once the terms associated with the icon 108 are received and/or extracted by the term input component 202, the terms can be sent to an equivalent terms identification component 204. The equivalent terms identification component 204 can identify equivalent terms to the terms received and/or extracted by the term input component 202. For example, the term "motel" might be equivalent to the term "hotel" or the term "scan" might be equivalent to the term "search". Therefore, "motel scan" can be identified as equivalent to "hotel search" at the equivalent terms identification component 204, thus indicating an equivalent or similar functionality as that of the software code associated with the icon 108.

Equivalent terms can be determined (e.g., via the equivalent terms identification component 204) by defining a distance between two terms to measure the semantic similarity of the two terms. The distance between the two terms can mean that the two terms are not very different from each other. For example, if the distance between the two terms is smaller than a pre-defined threshold, the two terms can be determined to be equivalent or close to equivalent. It should be noted that each term can comprise multiple words. Term distance can be computed by counting how many editing operations should be applied to transform one term to the other. Additionally, analyzing at a word level and computing the editing distance between the two words via a deep learning model can yield more precise results than analyzing at a character level. Therefore, the term distance can be computed at the word level, and a term similarity between the terms can be leveraged as a word distance. During an unsupervised deep learning, a semantic similarity between words can be computed based on statistical analysis of the correlation between each word and the context in which the word appears.

Alternatively, a summarization component 206 can receive the input terms directly from the term input component 202. Thereafter, or concurrently, the summarization component 206 can also receive equivalent term data from the equivalent terms identification component 204. The summarization component 206 can identify equivalent, similar, or dissimilar functionality to that of the software code associated with the icon 108 by performing a GUI summarization of display screen 2. For example, the system 200 can receive the terms "hotel search" at the term input component 202 and try to match the terms "hotel search" with a GUI display that is related to the terms "hotel search". Such a GUI display can comprise elements including, but not limited to: a listing of hotels, hotel names, availability, dates, price ranges, amenities, etc. Therefore, the summarization component 206 can infer, from the equivalent terms identification component 204, that the aforementioned listing of elements are associated with a GUI display comprising a hotel search function. By way of example, but not limitation, the summarization component 206 can analyze and/or learn the GUI display for various websites and/or mobile applications and their associated elements.

It should also be noted that the input terms can be passed to the summarization component 206 by way of the equivalent terms identification component 204. Terms can be further identified by finding terms that have more than a threshold number of occurrences or frequency within a webpage or GUI. Consequently, the summarization component 206 can output data indicative of the functionality of the software code of an icon to a correlation component 208. In response to the correlation component 208 receiving the output data from the summarization component, the correlation component 208 can then correlate the inferred functionality of the software code associated with the icon 106 of the GUI for the display screen 2 to that of the functionality of the software code of the icon 108 of the display screen 1.

It should be noted that the computations of the equivalent terms identification component 204 and the summarization component 206 can be performed simultaneously, concurrently or linearly, meaning that equivalent terms identification component 204 does not have to generate an output before the summarization component 206 generates an output, although this permutation is possible.

It should be appreciated that in some embodiments the mapping of software code words based on information processed via a user interface can comprise generating (e.g., via the correlation component 208) a scoring and/or an affinity value related to the correlation of the icon 106 of the GUI for the display screen 2 to that of the functionality of the software code associated with the icon 108 of the display screen 1. The correlation component 208 can provide a score for the correlation of semantics associated with the software code and/or GUI data associated with icons. A correlation score can be inversely proportional to the distance, as previously defined. Consequently, the higher the distance between two terms, the lower the correlation score. Therefore, the correlation score can be defined as: correlation score(s1,s2)=−distance(s1, s2), where s1 is a first term and s2 is a second term of the two terms. For instance, in one embodiment, the correlation component 208 can return ranked lists of terms, wherein the terms can be ranked based on the score associated with each term. Consequently, a score higher than a defined threshold can indicate a high level of correlation between semantics associated with the software code of the icon 106 to the software code of the icon 108, and/or a high level of correlation between semantics associated with the GUI data of the icon 106 to the GUI data of the icon 108.

Such classification can employ a probabilistic and/or statistical-based analysis to prognose or infer an action that can be performed. A support vector machine (SVM) is an example of a classifier that can be employed. The SVM can operate by finding a hypersurface in the space of possible inputs. Other directed and undirected classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority. The disclosed aspects can employ classifiers that are explicitly trained (e.g., via a generic training data) as well as implicitly trained (e.g., via observing the input terms usage as it relates to software code, receiving extrinsic information, and so on).

Figure 3:
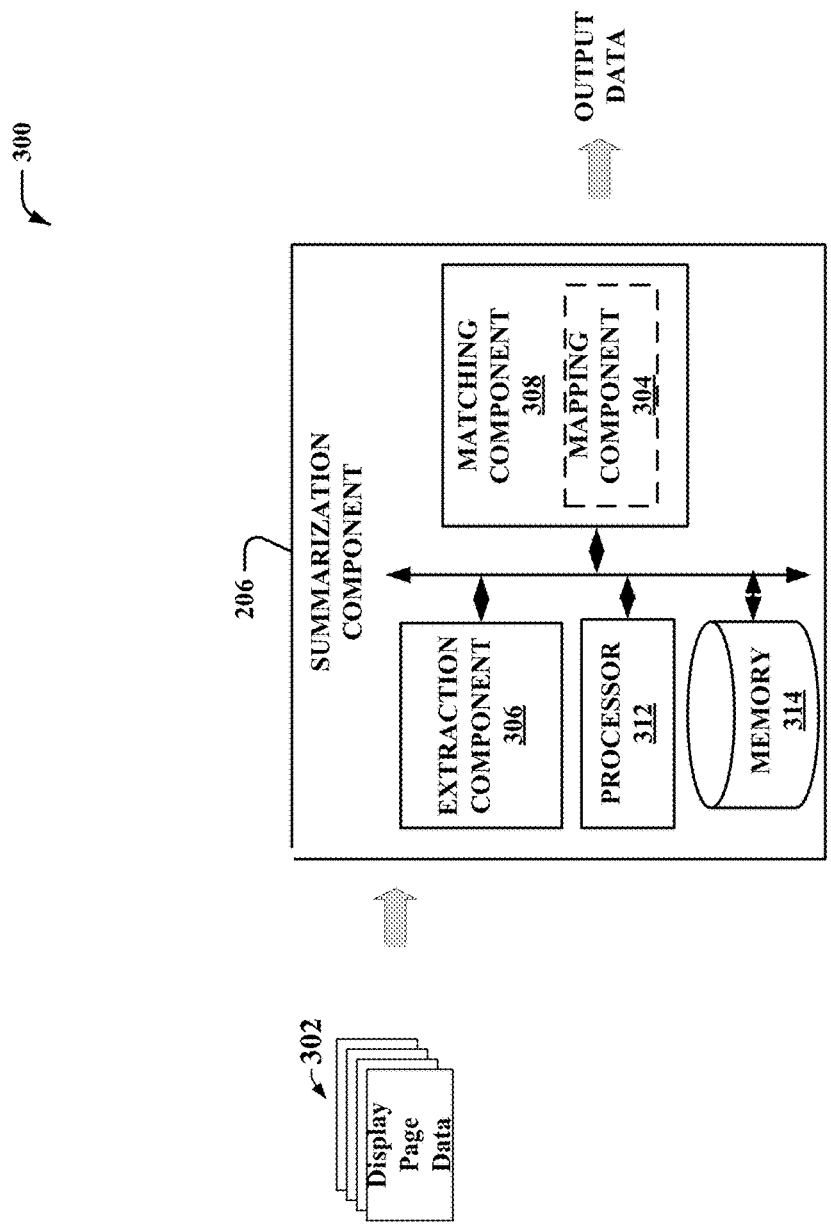
FIG. 3 illustrates yet another block diagram of an example, non-limiting summarization component that facilitates mapping of software code based on a user interface in accordance with one or more embodiments described herein.

FIG. 3 illustrates yet another block diagram of an example, non-limiting system that facilitates mapping of software code based on a user interface and summarization component in accordance with one or more embodiments described herein. Repetitive description of like elements employed in other embodiments described herein is omitted for sake of brevity.

In the embodiment shown in FIG. 3, the system 300 can comprise the summarization component 206 that can receive display page data 302. The display page data 302 can comprise terms, semantic data, pictures, icons, etc. associated with a display page. It should be noted that the sub-components (e.g., extraction component 306, matching component 308, and mapping component 304), processor 312, and memory 314 can bi-directionally communicate with each other. It should also be noted that in alternative embodiments that other components including, but not limited to the sub-components, processor 312, and/or memory 314, can be external to the summarization component 206, as shown in FIG. 2. In one aspect of FIG. 3, the display page data 302 can be extracted by the extraction component 306 of the summarization component 206. The extraction component 306 can extract semantic and/or visual data from the display page based on a user interaction with the 106 icon. A software program can be used to extract the semantic and/or visual data from the display page. The summarization component 206 can generate a summary of the display page based on an analysis of the extracted display page data 302 from the display page. The analysis can be based on a frequency of terms, pictures, icons, graphics, etc. The summarization can be achieved by applying a deep learning procedure via a deep learning engine located in the summarization component 206. The deep learning procedure can be trained with a dataset in which each record contains a screen as the input and a short text summary of the screen as the output. During the training, the deep learning engine can encode a statistical correlation between the inputs and the outputs, which can be approximated generally as a mathematical function. Then, in a practical use scenario, based on the statistical correlation, the deep learning engine can automatically output the summary for an input screen. Additionally, the deep learning procedure can have multiple layers, where the first layer summarizes small windows of the screen and the latter layer summarizes larger windows of the screen, which comprise the small windows in the previous layer. Terms, pictures, icons, and graphics with similar usage on multiple webpages can be determined to have similar meanings and/or functions in relation to other webpages and be predicted to be usable in the same context.

For example, analysis of various icons and/or text displayed on the display page can indicate that the display page is associated with a specific genre including, but not limited to a specific: industry, service, good, company, entity, organization, and/or a marketing platform, etc. Therefore, in an aspect, one output of the summarization component 206 can be information that can indicate and/or be employed to determine which terms or visual data associate the display page with another web page.

Based on the input data extracted by the extraction component 306, the matching component 308 can match the display page to one or more display pages of the same or similar genre. For example, based on the terms check-in, check-out, etc., the summarization component 206 can provide an output that indicates that the display page belongs to a genre associated with hotels. Consequently, the matching component 308 can match the display page to one or more display pages within the hotel genre by comparing the software code functionality of the icon 106 to the software code functionality of the icon 108, resulting in a compared software code functionality. As mentioned above, the score associated with the GUI data of the icons 106, 108 can be used by the match the icons 106, 108 to each other via the matching component 308. The matching component 308 can also comprise a mapping component 304. The mapping component 304 can also map software code associated with the functionality of the one or more display pages within the hotel genre to the display page, from which the display page data 302 was extracted, by analyzing the score. For example, if there is a "search" icon on the display page, based on the summarization component 206 indicating that the display page is associated with the hotel genre, the mapping component 304 can map the software code of the "search" icon to that of "search hotels" icons associated with one or more hotel webpages. The mapping component 304 can map the software code of the "search" icon to that of "search hotels" icons by indicating that the two icons perform similar functions when the software code associated with the two icons is executed.

Additionally, after the mapping has taken place, the display page, associated software code, and matching data can be added to the memory 314 of the summarization component 206 as another data point for growing the hotel genre database. This can increase or decrease the probability that future webpages are related to the hotel genre based on probability and statistics associated with the extracted terms and icons of previous webpages.

Aspects of the processor 312 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the summarization component 206. In an aspect, the summarization component 206 can also include memory 314 that stores computer executable components and instructions.

In an aspect, the input data can correspond to the data described with reference to FIG. 1. For example, in various embodiments, the input data can be a portion (e.g., a section) of the data. The input data can be received, for example, via a network. Alternatively, in some embodiments, the input data can be received from a database in communication with the summarization component 206 via a network. In some embodiments, the input data can be data that is transmitted to the summarization component 206.

Based on the input data, output data can be generated. In one example, the output data can be associated with a model for a neural network associated with processing components. In an aspect, the output data can be stored in the memory 314 or another memory associated with the summarization component 206.

Figure 4:
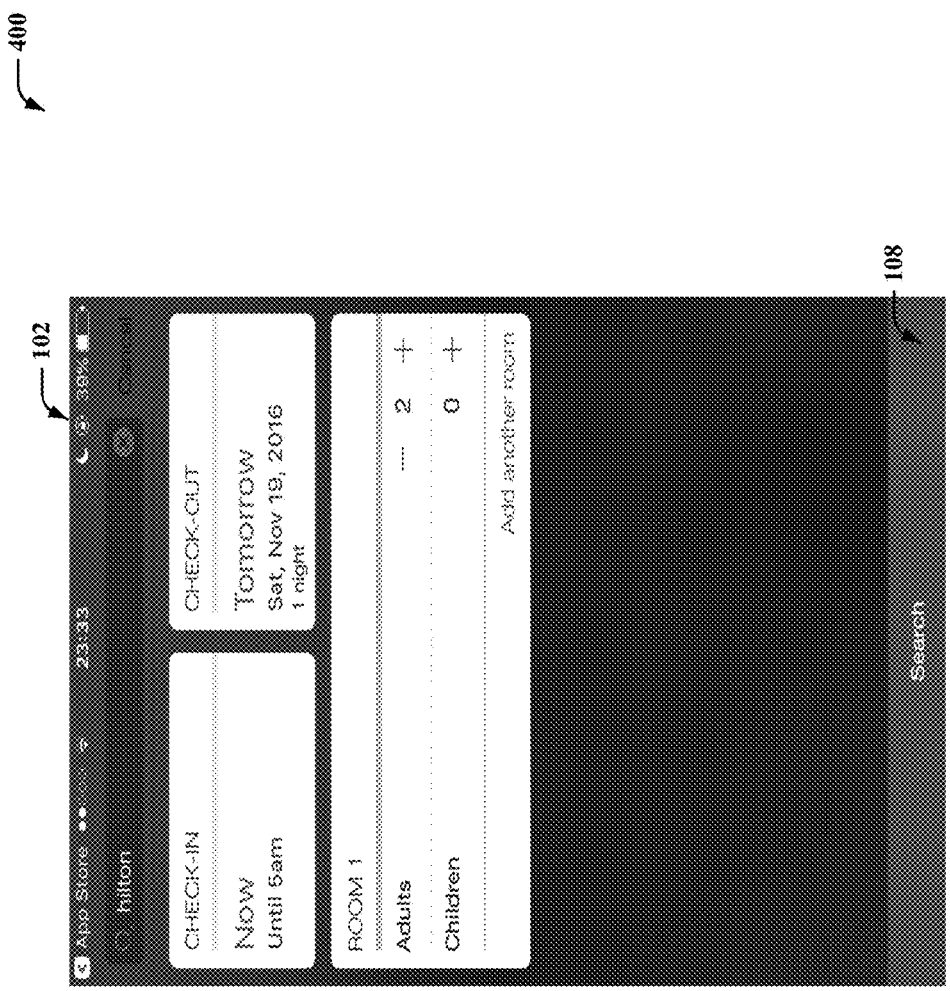
FIG. 4 illustrates an additional block diagram of an example, non-limiting mobile device display that facilitates mapping of software code based on a user interface in accordance with one or more embodiments described herein.

FIG. 4 illustrates an additional block diagram of an example, non-limiting mobile device display that facilitates mapping of software code based on a user interface in accordance with one or more embodiments described herein. Repetitive description of like elements employed in other embodiments described herein is omitted for sake of brevity.

In various embodiments, the system 400 can generate input data related to the display screen of the mobile device 102 as referenced in FIG. 1 to be extracted by the extraction component 306 of the summarization component 206. The input data can comprise the icon 108, the icon 108 name, semantic data (e.g., check-in, check-out, room number, etc.), GUI data, picture and/or graph data, genre data, etc. It should be noted that the input data can be sent to the summarization component 206 and/or the input data can be extracted from the display page of the mobile device by the extraction component 306 of the summarization component 206.

Figure 5:
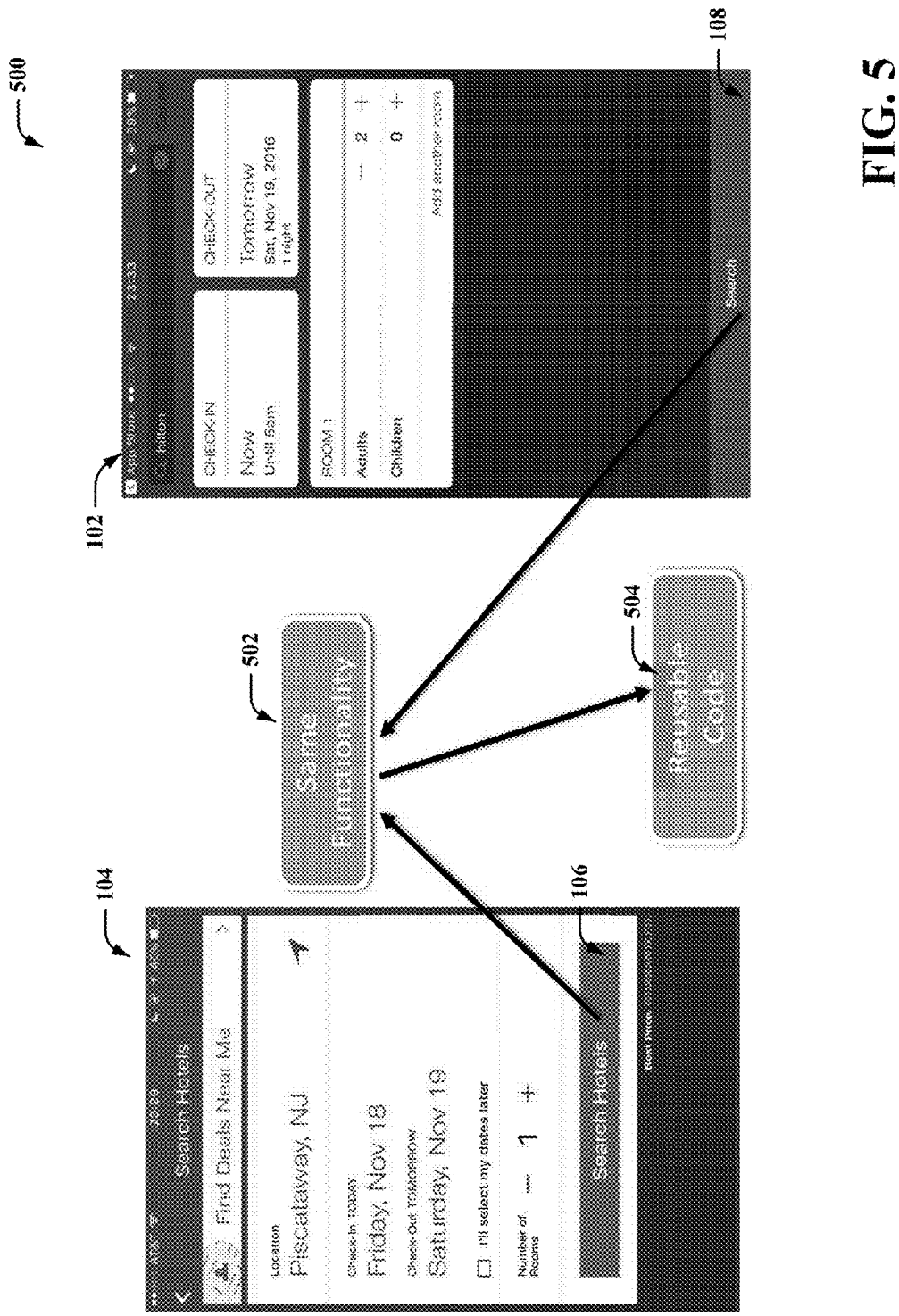
FIG. 5 illustrates an additional block diagram of example, non-limiting mobile device displays that facilitate mapping of software code based on a user interface correlation in accordance with one or more embodiments described herein.

FIG. 5 illustrates an embodiment of a non-limiting mobile device displays that facilitate mapping of software code based on a user interface in accordance with one or more embodiments described herein. Repetitive description of like elements employed in other embodiments described herein is omitted for sake of brevity.

In the embodiment shown, the input data related to the display screen of the mobile device 102 can be extracted by the extraction component 306 of the summarization component 206. Because the terms "search hotels" of the icon 106 of the display screen are not equivalent to the term "search" of the icon 108, the system 500 can analyze input data to determine if a relationship exists between the icons 106, 108 functionality. For example, it can be inferred (e.g., via the matching component 308) from the additional terms (e.g., check-in, check-out, room number, etc.) and the GUI of the display page of mobile device 102 that the display page is indeed related to hotels. Therefore, the software code associated with the icon 108 can be determined to comprise the same functionality 502 as that of the software code of the icon 106.

Consequently, the matching component 308 can generate data indicative of the probability that the icon 106 and the icon 108 perform the same function. Additionally, the mapping component 304 can then map the display page of the mobile device 104 to the display page of the mobile device 102 for future use. For example, knowing that the icon 106 and the icon 108 functionalities are the same or similar, the mapping component 304 can also label the underlying software code of the icons 106, 108 as reusable code 504.

Thus, when a user wants to generate a new webpage associated with hotels and apply a search functionality, the user can extract the code previously used to generate the search functionality for the icons of multiple display pages associated with hotel searches.

Figure 6:
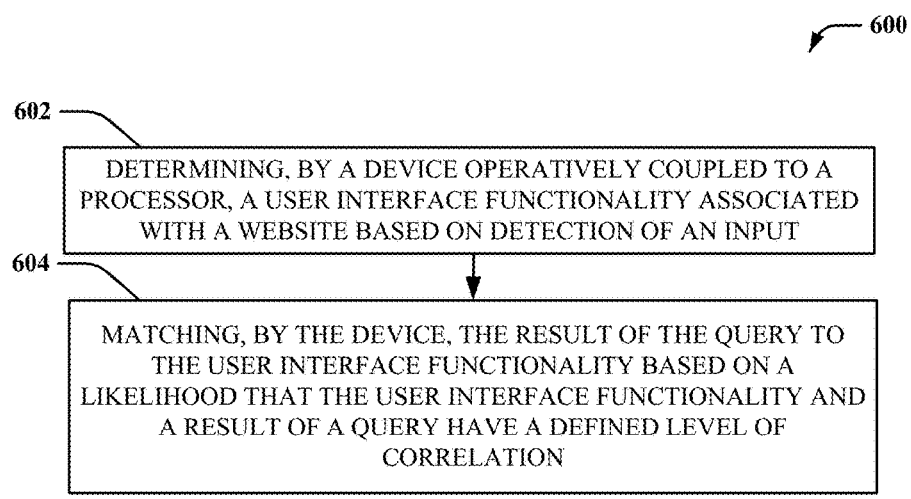
FIG. 6 illustrates a flow diagram of an example, non-limiting computer-implemented method that facilitates mapping of software code based on a user interface in accordance with one or more embodiments described herein.

FIG. 6 illustrates a flow diagram of an example, non-limiting computer-implemented method 600 that facilitates mapping of software code based on a user interface in accordance with one or more embodiments described herein. Repetitive description of like elements employed in other embodiments described herein is omitted for sake of brevity.

At 602, based on detection of an input, a user interface functionality associated with a website can be determined (e.g., by the summarization component 206). For example, the extraction component 306 can extract the display page data 302 as referenced in FIG. 3. The input data can comprise terms, graphics, semantics, equivalent term data, etc. The matching component 308 can match functionality associated with the icon (e.g., icon 106) of the display page to functionality associated with another icon (e.g., icon 108) of another display page. Thus, at 604, based on a likelihood that the user interface functionality and a result of a query have a defined level of correlation, the computer-implemented method 600 can match the result of the query to the user interface functionality (e.g., via the matching component 308).

Figure 7:
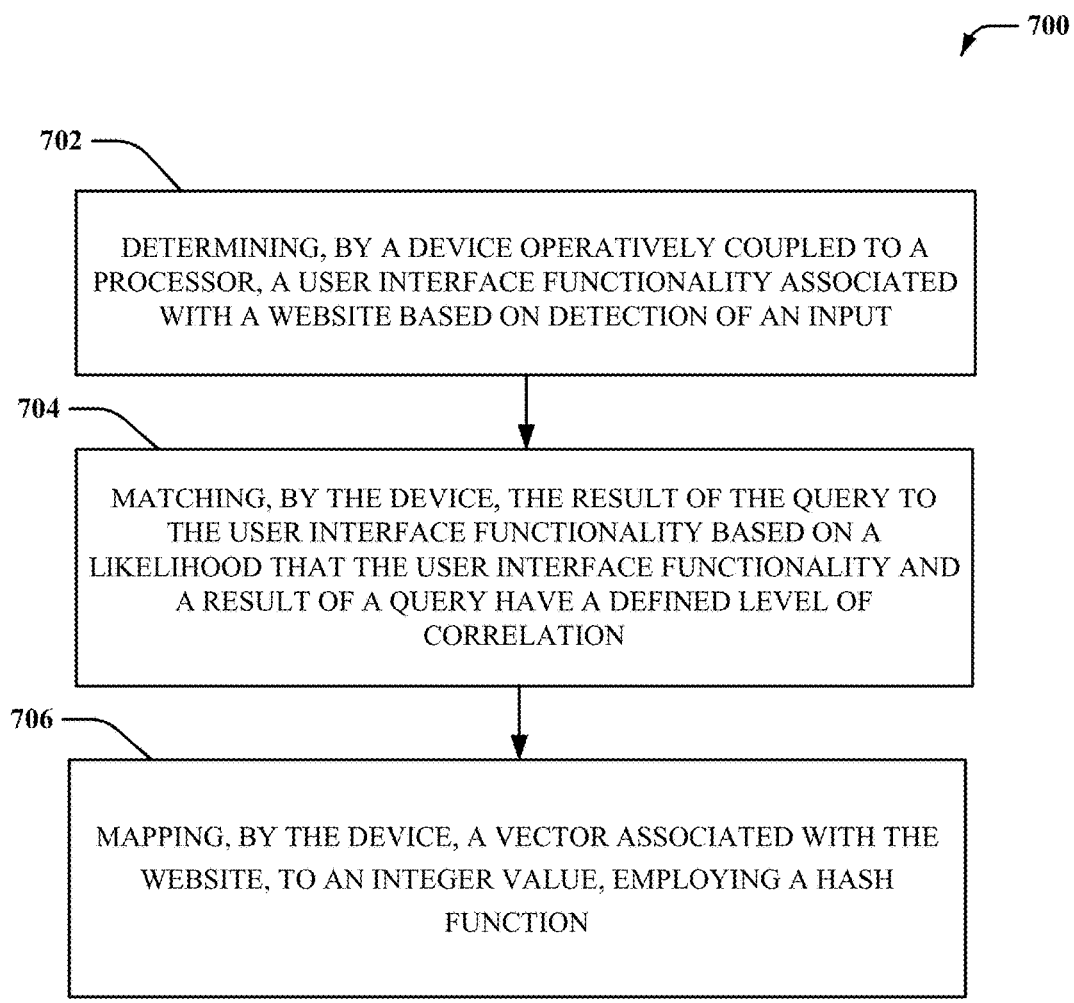
FIG. 7 illustrates a flow diagram of another example, non-limiting computer-implemented method that facilitates mapping of software code based on a user interface and employing a hash function in accordance with one or more embodiments described herein.

FIG. 7 illustrates yet another a flow diagram of an example, non-limiting computer-implemented method 700 that facilitates mapping of software code based on a user interface and employing a hash function in accordance with one or more embodiments described herein. Repetitive description of like elements employed in other embodiments described herein is omitted for sake of brevity.

At 702, based on detection of an input, a user interface functionality associated with a website can be determined (e.g., by the summarization component). For example, the extraction component 306 can extract the display page data 302 from the display page as referenced in FIG. 3. The input data can comprise terms, graphics, semantics, equivalent term data, etc. The matching component 308 can match functionality associated with the icon (e.g., icon 106) of the display page to functionality associated with another icon (e.g., icon 108) of another display page. Thus, at 704, based on a likelihood that the user interface functionality and a result of a query have a defined level of correlation, the computer-implemented method 700 can match the result of the query to the user interface functionality (e.g., via the matching component 308).

At 706, a vector associated with the website can be mapped (e.g., via the mapping component 304) to an integer value employing a hash function. A hash function can be any function that can be used to map data of an arbitrary size to data of a fixed size. The hash function can accelerate table or database lookup by detecting duplicated records. Therefore, the process of mapping the words "search hotels" to "search", for example, can be expedited by employing a hash function to detect the duplicated word "search". Additionally, the hash function can utilize a defined threshold value in relation to the mapping. For example, the hash function might be employed if a defined number of terms have been determined to exist on a webpage or mobile device application.

Figure 8:
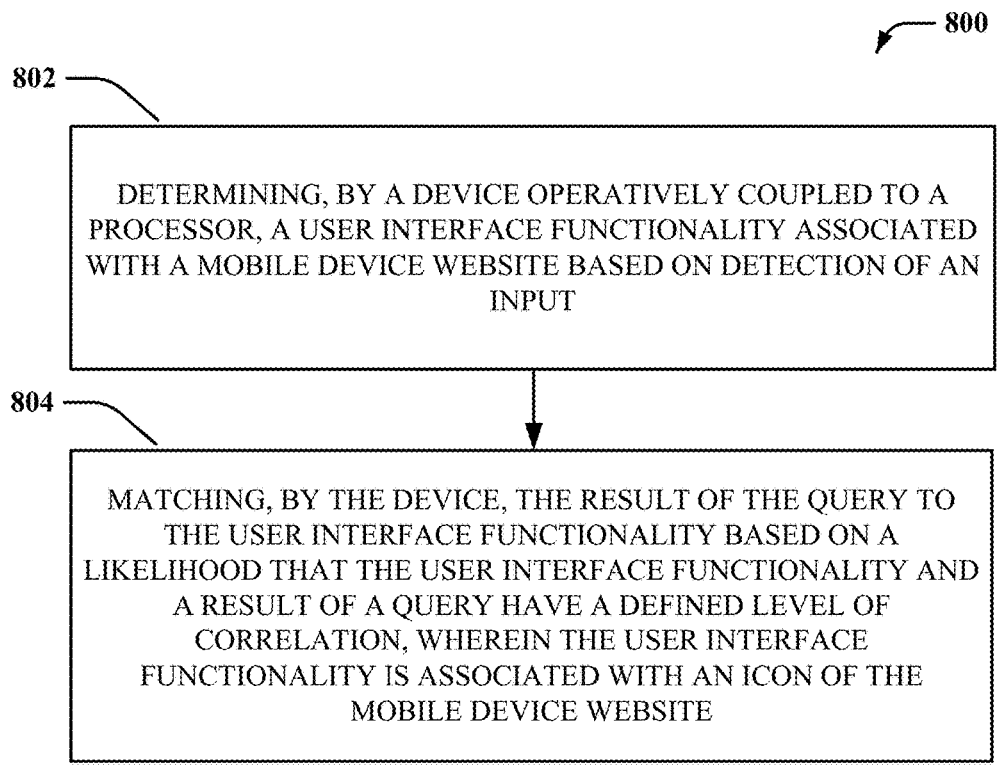
FIG. 8 illustrates a flow diagram of an example, non-limiting computer-implemented method that facilitates mapping of software code for a mobile device website based on a user interface in accordance with one or more embodiments described herein.

FIG. 8 illustrates a flow diagram of an example, non-limiting computer-implemented method 800 that facilitates mapping of software code for a mobile device website based on a user interface in accordance with one or more embodiments described herein. Repetitive description of like elements employed in other embodiments described herein is omitted for sake of brevity.

The computer-implemented method 800 can be performed by and/or associated with a plurality of processing components. At 802, based on detection of an input, the computer-implemented method 800 can determine a user interface functionality (e.g. via the summarization component 206) associated with a mobile device website. In one aspect, software code for an icon related to a mobile device application can be mapped (e.g. via the mapping component 304) to other software code of another icon related to another mobile device application. For example, input data including, but not limited to terms, graphics, semantics, equivalent term data, etc., can be matched (e.g. via the matching component 308) to data associated with another website. Furthermore, at 804, based on a likelihood that the user interface functionality and a result of a query have a defined level of correlation, the result of the query can be matched (e.g. via the matching component 308) to the user interface functionality, wherein the user interface functionality is associated with an icon of the mobile device website.

Figure 9:
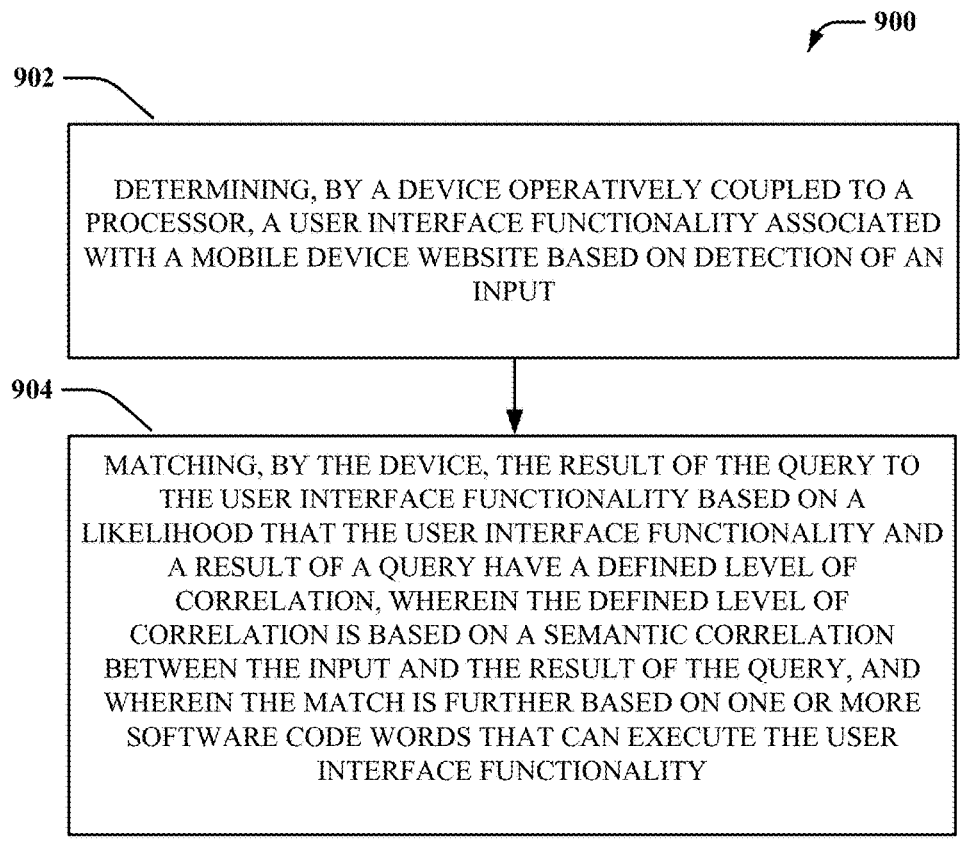
FIG. 9 illustrates a flow diagram of another example, non-limiting computer-implemented method that facilitates mapping of software code for a mobile device website based on a user interface and a semantic correlation in accordance with one or more embodiments described herein.

FIG. 9 illustrates a flow diagram of an example, non-limiting computer-implemented method 900 that facilitates mapping of software code for a mobile device website based on a user interface and a semantic correlation in accordance with one or more embodiments described herein. Repetitive description of like elements employed in other embodiments described herein is omitted for sake of brevity.

The computer-implemented method 900 can be performed by and/or associated with a plurality of processing components. At 902, based on detection of an input, the computer-implemented method 900 can determine (e.g. via the summarization component 206) a user interface functionality associated with a mobile device website. For example, input data including, but not limited to terms, graphics, semantics, equivalent term data, etc., can be matched (e.g. via the matching component 308) to data associated with another mobile device website. At 904, based on a likelihood that the user interface functionality and a result of a query have a defined level of correlation, the result of the query can be matched (e.g. via the matching component 308) to the user interface functionality. The defined level of correlation can be determined by generalizing a display screen associated with a mobile device application. For instance, a deep learning model can be built by leveraging data to build a model and then training the model to do a predication of the correlation between graphics, semantics, etc. The prediction can then be based on a probability function associated with a neural network. Accordingly, the probability function associated with the neural network can then determine which correlations are more likely. Thus, the defined level of correlation can be based on a semantic correlation between the input and the result of the query, and the match can be further based on one or more software code words that can execute the user interface functionality at 904.

Figure 10:
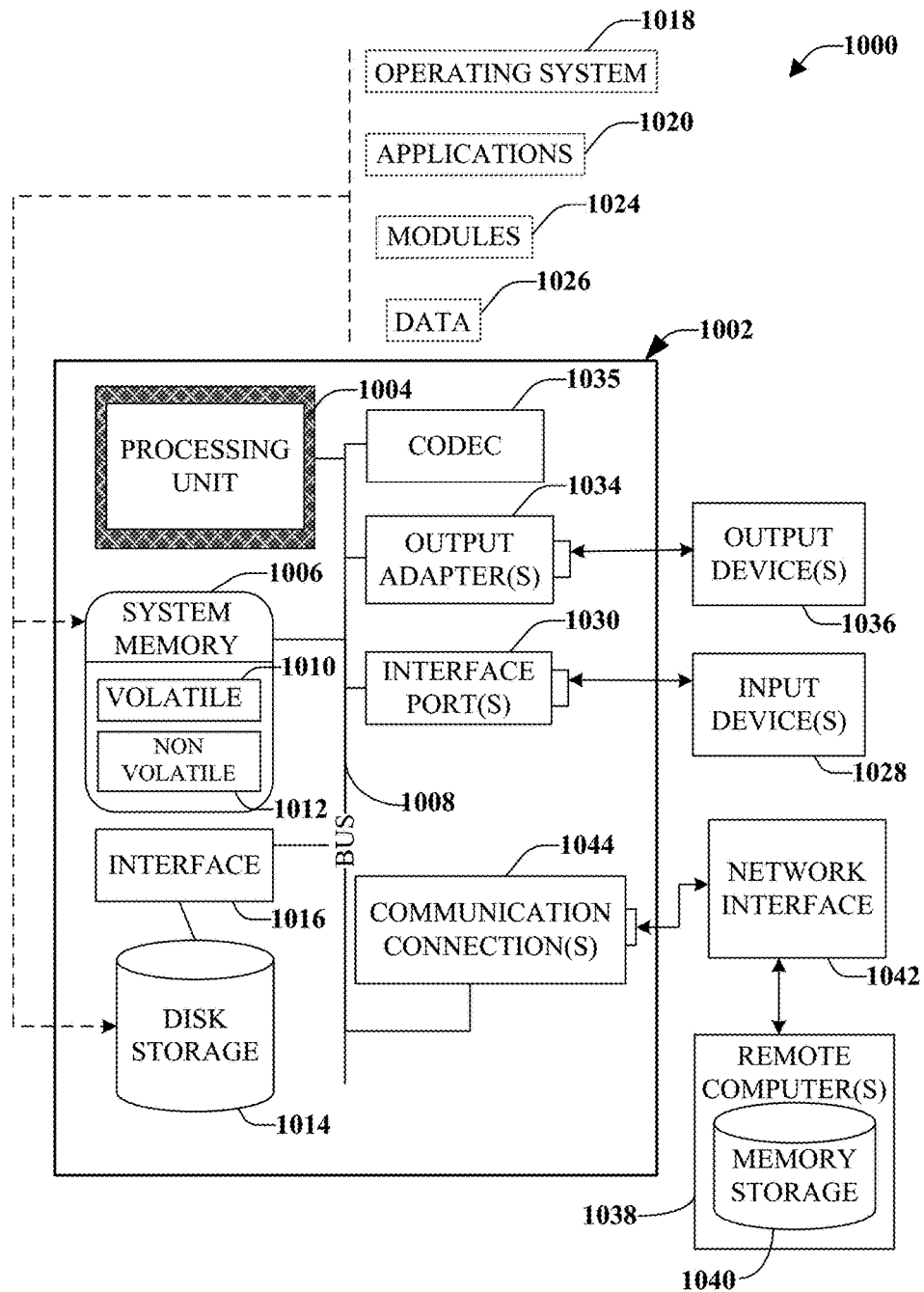
FIG. 10 illustrates a block diagram of an example, non-limiting operating environment in which one or more embodiments described herein can be facilitated.

In order to provide a context for the various aspects of the disclosed subject matter, FIG. 10 as well as the following discussion is intended to provide a general description of a suitable environment in which the various aspects of the disclosed subject matter can be implemented. FIG. 10 illustrates a block diagram of an example, non-limiting operating environment in which one or more embodiments described herein can be facilitated. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability;

multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product that facilitates a software code word search, the computer program product comprising a computer readable storage medium having program instructions embodied therewith, the program instructions executable by a processor to cause the processor to:
    based on detection of an input to a system:
        generate a summary of a first user interface page of a website based on an analysis of extracted display page data for display in the first user interface page, and
        determine, by the processor, a first user interface functionality associated with a user interface element of the first user interface page of the website based on the summary;
    based on a determination that the first user interface functionality and a result of a query have a defined level of correlation, match, by the processor, the result of the query to the first user interface functionality, wherein the result of the query comprises a second user interface functionality associated with a second user interface page that is distinct from the first user interface page, the defined level of correlation is generated based on determining one or more terms of the result of the query that have a defined level of equivalence to a term in the summary, and the defined level of equivalence for a term of the one or more terms is computed by counting how many editing operations should be applied to transform the term of the one or more terms into the term in the summary; and
    based on the result of the query, generate the second user interface functionality for another website by reusing software code associated with the user interface element.

2. The computer program product of claim 1, wherein the defined level of correlation is based on a semantic correlation between the first user interface functionality and the second user interface functionality.

3. The computer program product of claim 1, wherein the extracted display page data is selected from the group consisting of semantic data and visual data.

4. The computer program product of claim 1, wherein the website is associated with a mobile device.

5. The computer program product of claim 1, wherein the summary is a textual summary describing a context of the first user interface page.

6. The computer program product of claim 1, wherein the user interface element is an icon of the website.

7. The computer program product of claim 6, wherein the icon is associated with a search application.

8. The computer program product of claim 1, wherein the first user interface functionality is associated with a table.

9. The computer program product of claim 8, wherein the table is associated with a calendar application.

10. A system, comprising:
    a memory that stores computer executable components; and
    a processor that executes the computer executable components stored in the memory, wherein the computer executable components comprise:
        an extraction component that:
            based on detection of an input to the system:
                generates a summary of a first user interface page of a first mobile application based on an analysis of extracted display page data for display in the first user interface page, and
                determines a first user interface functionality of software code associated with a user interface element of the from a first user interface page based on the summary; and a matching component that:

based on a determination that the first user interface functionality and a result of a query have a defined level of correlation, matches the result of the query to the first user interface functionality, wherein the result of the query comprises a second user interface functionality associated with a second user interface page that is distinct from the first user interface page, the defined level of correlation is generated based on determining one or more terms of the result of the query that have a defined level of equivalence to a term in the summary, and the defined level of equivalence for a term of the one or more terms is computed by counting how many editing operations should be applied to transform the term of the one or more terms into the term in the summary; and based on the result of the query, generates the second user interface functionality for a second mobile application by reusing software code associated with the user interface element.

11. The system of claim 10, wherein the defined level of correlation is based on a semantic correlation between the first user interface functionality and the second user interface functionality.

12. The system of claim 10, wherein the extracted display page data is selected from the group consisting of semantic data and visual data.

13. The system of claim 10, wherein the first mobile application and the second mobile application operate on a mobile device.

14. The system of claim 10, wherein the summary is a textual summary describing a context of the first user interface page.

15. The system of claim 10, wherein the user interface element is an icon of the mobile application.

16. The system of claim 15, wherein the icon is associated with a search application.

\* \* \* \* \*